(12) United States Patent
Khazanov et al.

(10) Patent No.: US 9,940,825 B2
(45) Date of Patent: Apr. 10, 2018

(54) BAROMETRIC PRESSURE TO REDUCE SECURITY FALSE ALARMS

(71) Applicant: Robert Bosch GmbH, Stuttgart (DE)

(72) Inventors: Alex Khazanov, Rochester, NY (US); Othmane Bennis, Rochester, NY (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/042,994

(22) Filed: Feb. 12, 2016

(65) Prior Publication Data

US 2017/0236405 A1    Aug. 17, 2017

(51) Int. Cl.
*G01W 1/02* (2006.01)
*G08B 19/00* (2006.01)
*G08B 13/00* (2006.01)
*G08B 29/18* (2006.01)
*G08B 21/18* (2006.01)

(52) U.S. Cl.
CPC ............. *G08B 29/185* (2013.01); *G01W 1/02* (2013.01); *G08B 21/182* (2013.01)

(58) Field of Classification Search
None
See application file for complete search history.

(56) References Cited

U.S. PATENT DOCUMENTS

| | | | |
|---|---|---|---|
| RE34,788 E * | 11/1994 | DuRand, III | G08B 13/1681 340/522 |
| 6,989,745 B1 | 1/2006 | Milinusic et al. | |
| 7,218,217 B2 | 5/2007 | Adonailo et al. | |
| 7,908,921 B2 | 3/2011 | Binda et al. | |
| 2003/0156031 A1* | 8/2003 | Philippe | G08B 13/1681 340/565 |
| 2004/0135683 A1* | 7/2004 | Sakai | B60R 25/1004 340/522 |
| 2008/0198006 A1 | 8/2008 | Chou | |
| 2009/0295578 A1 | 12/2009 | Gantt | |
| 2010/0288468 A1* | 11/2010 | Patel | B01D 46/10 165/59 |
| 2014/0266669 A1 | 9/2014 | Fadell et al. | |

* cited by examiner

*Primary Examiner* — Joseph Feild
*Assistant Examiner* — John Mortell
(74) *Attorney, Agent, or Firm* — Michael Best & Friedrich LLP

(57) ABSTRACT

A security monitoring system includes at least one sensor configured to sense an event condition. A security monitoring system controller communicates with the sensor and an indicator of alarm and trouble conditions. The central security system also detects barometric pressure within a monitored area. The security system controller is configured to receive an event signal indicative of an event from the at least one of the sensors and receive an indication of the barometric pressure from a barometer. When the barometric pressure from the barometer indicates a change in barometric pressure, the security monitoring system controller confirms that the event is present and outputs an indication signal to the indicator based on the confirmed event. When the barometric pressure from the barometer does not indicate a change in barometric pressure, the security monitoring system controller suppresses the output of the indication signal.

16 Claims, 5 Drawing Sheets

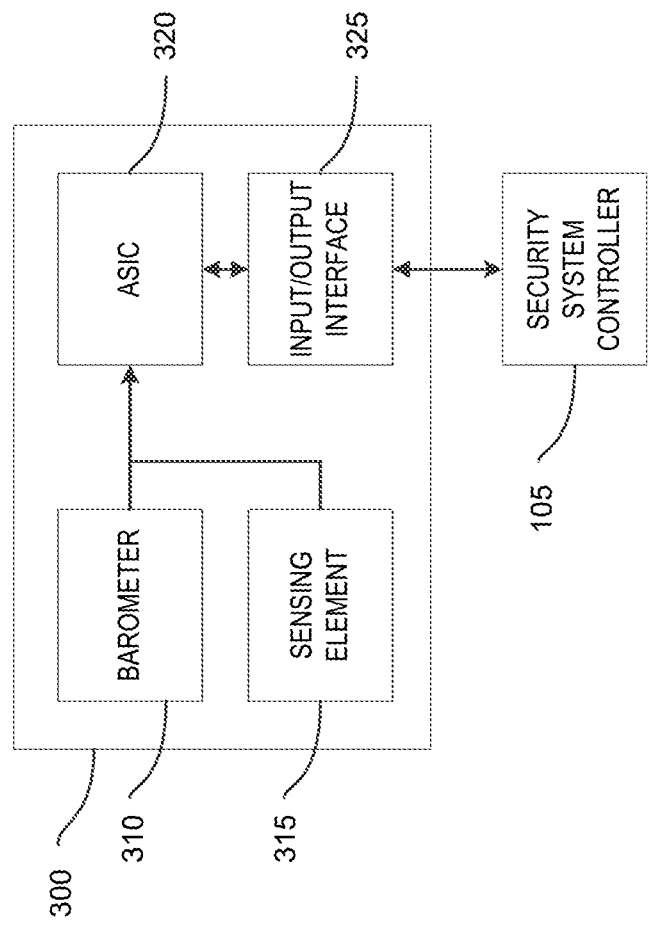

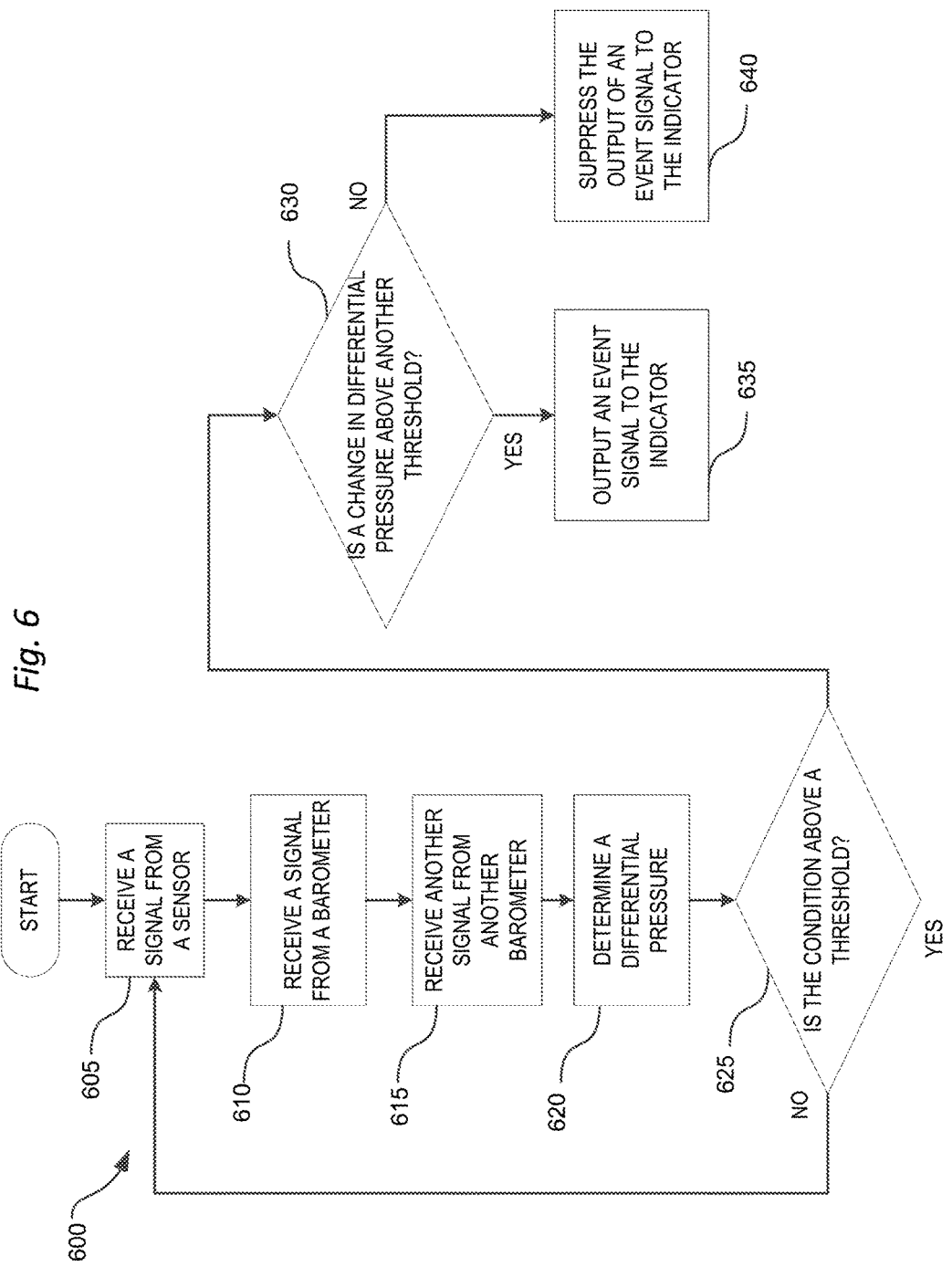

BAROMETRIC PRESSURE TO REDUCE SECURITY FALSE ALARMS

BACKGROUND

Embodiments of the present invention relate to security alarm systems and methods of operating security alarm systems.

SUMMARY

Security monitoring systems are designed to detect intrusion or unauthorized entry into a building or an area. Security monitoring systems may be used for a variety of applications including residential, commercial, industrial, and military. These systems provide protection against burglary and property damage, as well as protection against intruders. In addition, these systems may assist in providing fire protection and fire alarm services. These systems may also provide access control to restricted or alarmed areas. However, many security systems generate false alarms based on faulty or over-sensitive alarm sensors.

Accordingly, embodiments of the invention provide methods and systems for confirming an event detected by a security system based on barometric pressure. For example, in one embodiment, the invention provides a security monitoring system including a security system controller communicatively coupled to at least one sensors, an indicator, and a barometer. The security system controller is configured to receive a first signal from at least one sensor. The first signal being indicative of a condition within a monitored area. The security system controller is also configured to receive a pressure indication signal from the barometer. The second signal being indicative of barometric pressure within the monitored area. The security system controller is further configured to determine whether the second signal indicates a change in the barometric pressure. When the first signal indicates that the condition is above a threshold and the second signal indicates a change in barometric pressure, the security system controller outputs an event signal to the indicator. Conversely, when the first signal indicates that the condition is above the threshold and the second signal does not indicate a change in barometric pressure, the security system controller suppresses the output of the event signal.

In another embodiment the invention provides a method of monitoring an area with a security system controller that is communicatively coupled to at least one sensor, an indicator, and a barometer. The method includes receiving a first signal, at the security system controller, from the at least one sensor. The first signal being indicative of a condition within a monitored area. A second signal is received, at the security system controller, from the barometer. The second signal being indicative of barometric pressure within the monitored area. The security system controller determines whether the second signal indicates a change in the barometric pressure. An event signal is outputted to the indicator when the first signal indicates that the condition is above a threshold and the second signal indicates a change in barometric pressure. The event signal is suppressed when the first signal indicates that the condition is above the threshold and the second signal does not indicate a change in barometric pressure.

In yet another embodiment, the invention provides a security system controller communicatively coupled to at least one sensor, an indicator, and a barometer. The security system controller is configured to receive a first signal from at least one sensor. The first signal being indicative of a condition within a monitored area. A second signal is received from the barometer. The second signal being indicative of a barometric pressure within the monitored area. The first signal received from the at least one sensor is confirmed based on the second signal received from the barometer. When the first signal is confirmed, the security system controller outputs a third signal to the indicator. The third signal being indicative of an event within the monitored area. When the first signal not confirmed, the security system controller outputs a fourth signal to the indicator. The fourth signal being indicative of a trouble status in the security monitoring system.

Other aspects of the invention will become apparent by consideration of the detailed description and accompanying drawings.

BRIEF DESCRIPTION OF THE DRAWINGS

FIG. 3 is a block diagram of an integrated sensor including a barometer and a sensing element according to one embodiment.

FIG. 6 is a flowchart of another method of operating the security monitoring system of FIG. 1.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways It should be noted that a plurality of hardware and software based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processors. As such, it should be noted that a plurality of hardware and software based devices, as well as a plurality of different structural components may be utilized to implement the invention. For example, "control units" and "controllers" described in the specification can include one or more processors, one or more memory modules including non-transitory computer-readable medium, one or more input/output interfaces, and various connections (e.g., a system bus) connecting the components.

Figure 1:
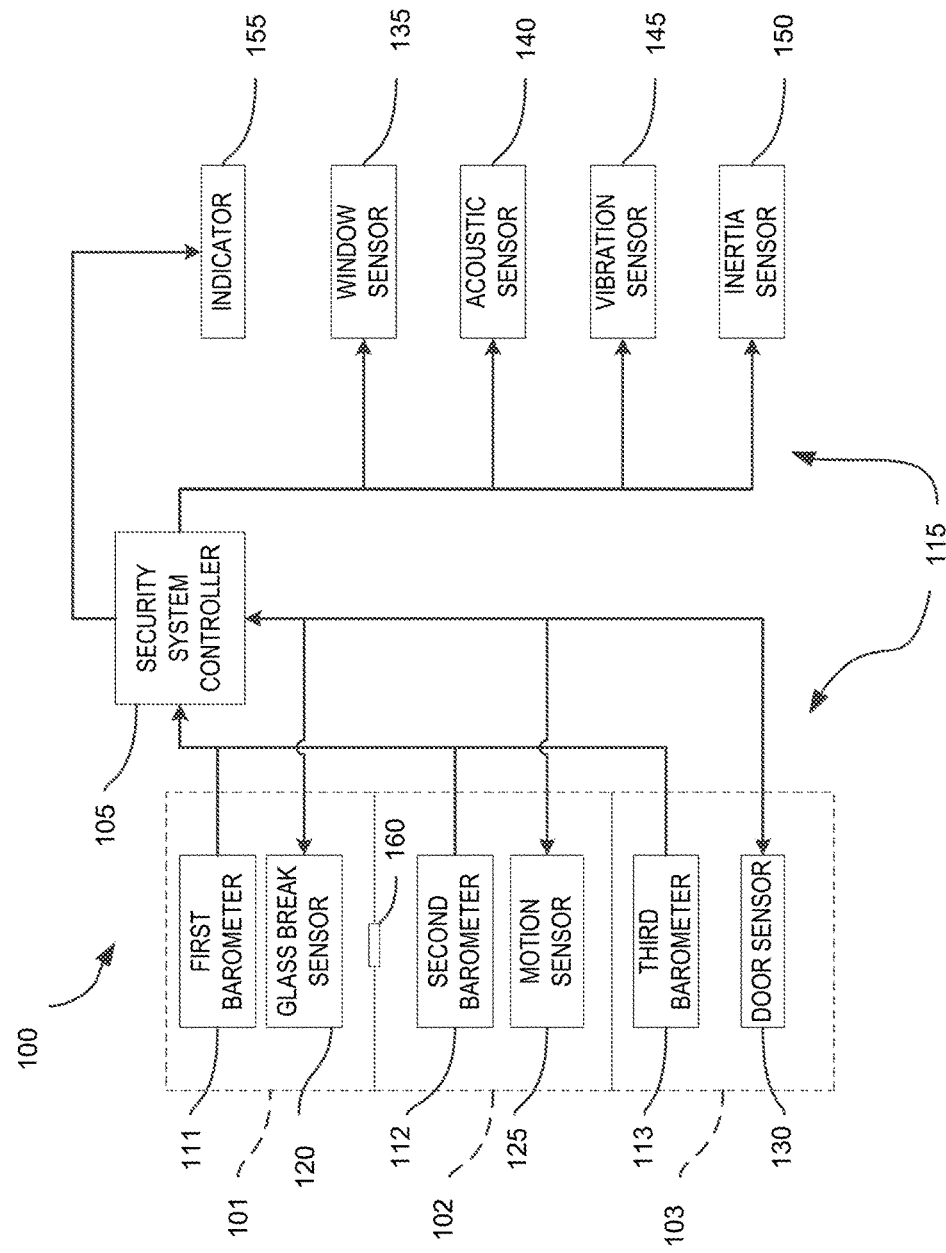
FIG. 1 is a block diagram of a security monitoring system according to one embodiment.

FIG. 1 illustrates a security monitoring system 100 that monitors a plurality of areas according to one embodiment of the invention. The security monitoring system 100 monitors a first area 101, a second area 102 adjacent to the first area 101, and a third area 103 adjacent to the second area 102. Each of these areas may represent individual rooms connected by doors or zones within a building. The security monitoring system 100 includes a security system controller 105 (e.g., a central security alarm panel), a first barometer 111, a second barometer 112, a third barometer 113, and a plurality of sensors 115. The plurality of sensors 115 may include a glass break sensor 120, a motion sensor 125, a door sensor 130, a window sensor 135, an acoustic sensor 140, a vibration sensor 145, an inertia sensor 150, and others. The sensors 115 sense conditions within the monitored areas of the security monitoring system 100. In other words, the sensors 115 detect particular conditions or events within the monitored area. For example, the glass break sensor 120 detects vibrations or sounds at predetermined frequencies that typically indicate glass breaking. In another example, the motion sensor 125 may sense motion directly through a change in reflection of ultrasonic waves or microwaves or may sense motion indirectly through a change in heat signature of an area. Regardless of the type, each of the plurality of sensors 115 has a particular sensitivity to a particular condition (e.g., motion, sound, temperature, and the like). One or more of the plurality of sensors 115 may be programmed with a threshold associated with the condition sensed by the sensor (e.g., an amount of motion, a noise level, a temperature level, and the like). When the threshold is satisfied by the condition sensed by the sensor, the sensor transmits an signal indicating the presence of an event to the security system controller 105. As described in more detail below, in some embodiments, the threshold of a sensor may be modified to adjust the sensitivity of the sensor. Also, in some embodiments, the security system controller 105 may apply a threshold in addition to or as an alternative to a sensor applying a threshold.

It should be understood that although FIG. 1 illustrates the security monitoring system 100 as monitoring three areas, the security monitoring system 100 may be used to monitor more or less areas. For example, in some embodiments, the security monitoring system 100 only monitors a single area. Similarly, although FIG. 1 illustrates the security monitoring system 100 as including three barometers, the security monitoring system 100 may include a single barometer. Also, in some embodiments, the security monitoring system 100 includes a single sensor. For example, in some embodiments, the security monitoring system 100 includes a single sensor and a single barometer for monitoring one area.

The security monitoring system 100 also optionally includes at least one indicator 155. The indicator 155 provides notifications based on signals output from the security system controller 105. The indicator 155 may include a visual indicator, such as, for example, a warning light or a graphical display (e.g., computer display), an audible indicator, such as, for example, speakers, horns, sirens, buzzers, and others, or a combination thereof. The indicator 155 may also be included in a user interface of the security system controller 105 as described below. In some embodiments, the security monitoring system 100 includes multiple indicators 155 that may be used to indicate different conditions for the security monitoring system 100. In particular, one or more indicators 155 may receive signals from the security system controller 105 and provide notifications associated with one or more conditions, events, operating modes, system status, and the like, such as, for example, an alarm notification, a trouble notification, door status notification, and the like.

The first barometer 111 senses a barometric pressure in the first area 101, the second barometer 112 senses a barometric pressure in the second area 102, and similarly, the third barometer 113 senses barometric pressure in the third area 103. The security system controller 105 receives the barometric pressures from the barometers 111, 112, and 113 and uses the barometric pressures to monitor the areas 101, 102, and 103. In particular, when an event is detected at one of the plurality of sensors 115 and the one of the plurality of sensors 115 sends an event signal indicative of an alarm condition to the security system controller 105, the security system controller 105 reads the barometric pressure received from one or more of the barometers 111, 112, and 113 to confirm the event. For example, when the glass break sensor 120 positioned in the first area 101 senses a glass break event and transmits a corresponding event signal to the security system controller 105, the security system controller 105 reads the barometric pressure of the first area 101 from the first barometer 111. If the barometric pressure in the first area 101 has changed since a previous reading (e.g., occurring prior to the event signal transmitted by the glass break sensor 120), the security system controller 105 confirms that a glass break event occurred (e.g., and can transmit a signal to the indicator 155). Conversely, when the glass break event signal is received at the security system controller 105 and the barometric pressure has not changed since a previous reading, the security system controller 105 may suppress activation of a notification (e.g., through the indicator 155) or other automatic action in response to the event detected by the glass break sensor 120. As a consequence, the security system controller 105 is able to filter false alarms that may arise from a sensor fault or an over-active sensor.

Similarly, the security system controller 105 may confirm a status of a door 160 (e.g., a fire door) with the first barometer 111 and the second barometer 112. For example, when the security system controller 105 receives a signal from a sensor detecting opening of the door 160 (e.g., a door interlock sensor), the security system controller 105 detects whether the first barometer 111 and the second barometer 112 sense and output different barometric pressure readings (e.g., a difference in readings above a threshold). When the first and second barometers 111 and 112 output different barometric pressure readings, the security system controller 105 may determine that the first area 101 and the second area 102 are isolated from each other, which indicates that the door 160 is closed. Conversely, when the first barometer 111 and the second barometer 112 output similar readings, the security system controller 105 may determine that the door 160 is open. In this situation, the security system controller 105 may output a door status signal to the indicator 155, which the indicator 155 uses to generate a notification that the door 160 may be ajar.

Similarly, the security system controller 105 may use the first barometer 111 and the second barometer 112 to confirm movement through the door 160. For example, when the security system controller 105 receives a signal from a motion sensor indicating a motion event, the security system controller 105 determines whether the barometric pressure between the first barometer 111 and the second barometer 112 equalizes. When the barometric pressure between the first barometer 111 and the second barometer 112 equalizes, the security system controller 105 may determine that the door 160 has opened and thus, that a person is moving between the first area 101 and the second area 102. Similarly, when the barometric pressure equalizes between the second area 102 and the third area 103, the security system controller 105 may determine that a person is moving through a door between the second area 102 and the third area 103. The security system controller 105 may accordingly transmit signals to the indicator 155 or take other automatic actions in response to confirming the event. These examples may extend to other monitored areas. In this way, the security system controller 105 can use barometric pressure (e.g., comparisons between barometric pressure in different areas) to confirm a door status and to confirm movement of intruders from room to room.

Figure 2:
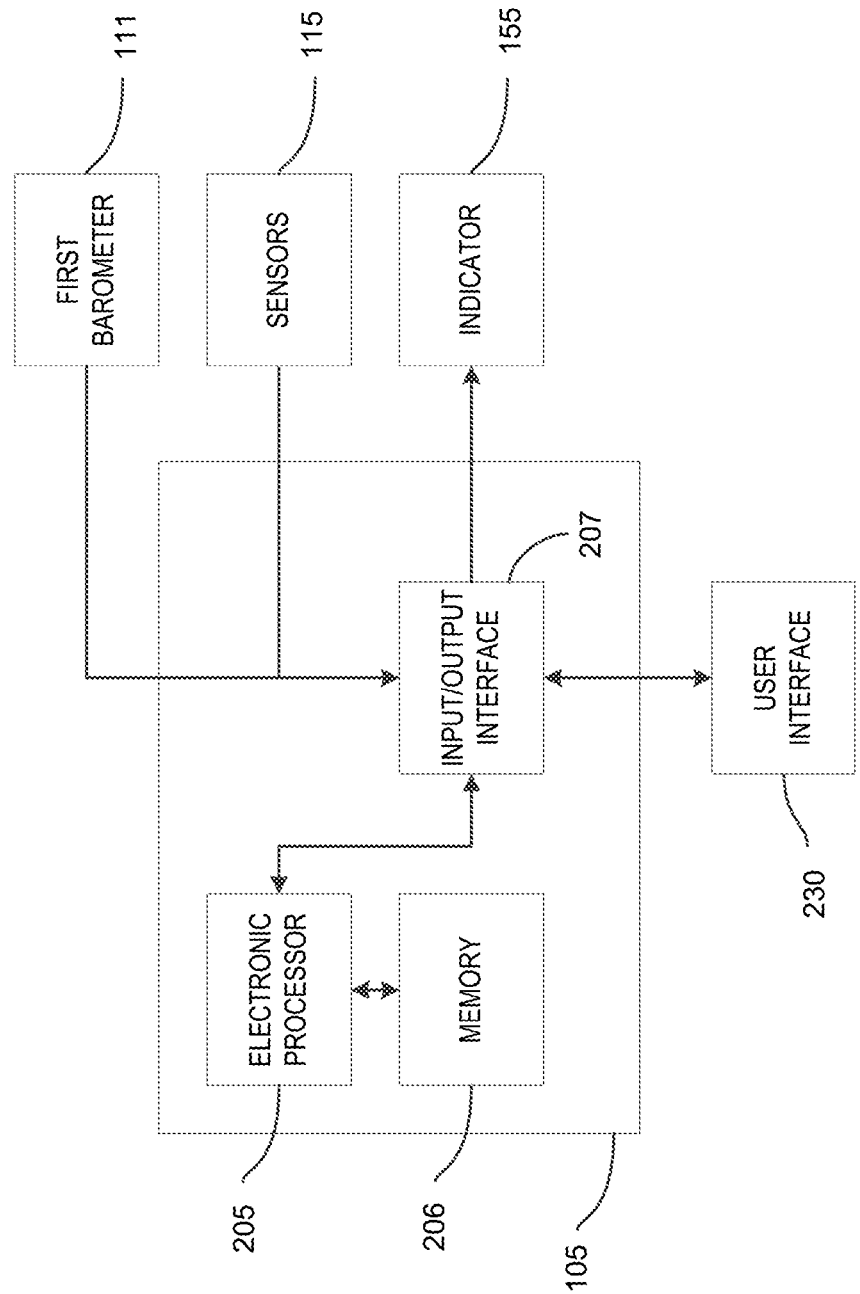
FIG. 2 is a block diagram of a security system controller included in the security monitoring system of FIG. 1.

FIG. 2 illustrates one construction of the security system controller 105 for the security monitoring system 100. The security system controller 105 includes a plurality of electrical and electronic components that provide power, operation control, and protection to the components and modules within the security system controller 105. The security system controller 105 includes an electronic processor 205 (e.g., a programmable electronic microprocessor, microcontroller, or similar device), a memory 206 (e.g., non-transitory, machine-readable memory), and an input/output interface 207. The electronic processor 205 is communicatively coupled to the memory 206 and executes instructions stored on the memory 206. The electronic processor 205 is configured to retrieve from memory 206 and execute, among other things, instructions related to the control processes and method described herein. In other embodiments, the security system controller 105 includes additional, fewer, or different components.

The input/output interface 207, which may include one or more ports and wired or wireless interfaces, receives and transmits data external to the security system controller 105 including the plurality of sensors 115, the first barometer 111, the second barometer 112, the third barometer 113, and the indicator 155. It should be understood, however, that one or more of these devices can also include included in the security system controller 105 rather than being positioned external to the security system controller 105. When the input/output interface 207 receives input from the plurality of sensors 115 and the barometers 111, 112, and 113, the security system controller 105 may store the received input in the memory 206. The security system controller 105 may receive this input periodically based on predetermined settings within the security system controller 105.

The input/output interface 207 is also communicatively coupled to a user interface 230. The user interface 230 may include a visual display (e.g., a computer monitor, a touch screen), a keyboard, a mouse, a printer, and others. The user interface 230 may be used to program, change parameters, set scheduling, and perform other tasks for the security system controller 105. The user interface 230 may also be used to send instructions to the plurality of sensors 115 through the security system controller 105.

As noted above, when detecting a condition, an event, an error, or an alarm state, the security system controller 105 may send an indication signal to the indicator 155. The security system controller 105 may also send a signal indicating a current status of the security monitoring system 100 to the user interface 230. In some embodiments, the indicator 155 is incorporated in the user interface 230 in a single housing or as a single device.

It should be also be understood that, in some embodiments, one or more of the plurality of sensors 115 may be incorporated with a barometer. For example, FIG. 3 illustrates an integrated sensor/barometer 300 according to one embodiment. In such a construction, a sensor and a barometer are included in a single housing. In one embodiment, the integrated sensor/barometer 300 senses a barometric pressure of an area and a condition of the area. As illustrated in FIG. 3, the integrated sensor/barometer 300 includes a barometer 310, a sensing element 315, an application specific integrated circuit (ASIC) 320, and an input/output interface 325. The input/output interface 325 is communicatively coupled (e.g., over a wired or wireless connection) to the security system controller 105. The sensing element 315 may include a glass break sensor, a motion sensor, a door sensor, a window sensor, an acoustic sensor, a vibration sensor, an inertia sensor, or a combination of these sensor types. The ASIC 320 may be configured to process data sensed by the sensing element 315, the barometer 310, or both. For example, the ASIC 320 may be configured to compare a condition sensed by the sensing element 315 to a threshold to determine whether an event signal should be transmitted to the security system controller 105. Alternatively or in addition, the ASIC 320 may be configured to determine when the barometric pressure sensed by the barometer 310 has changed (e.g., by a predetermined amount over a predetermined period of time).

In operation, the integrated sensor/barometer 300 may output both a barometric pressure and a condition signal to the security system controller 105 periodically or upon request. In another embodiment, the integrated sensor/barometer 300 may send a status signal to the security system controller 105 without sending particular values of the barometric pressure or the sensed condition (e.g., a pressure change or pressure constant status signal). Also, in some embodiments, the integrated sensor/barometer 300, via the ASIC 320, internally confirms or suppresses an event signal to the security system controller 105 based on the barometric pressures as discussed herein.

Figure 4:
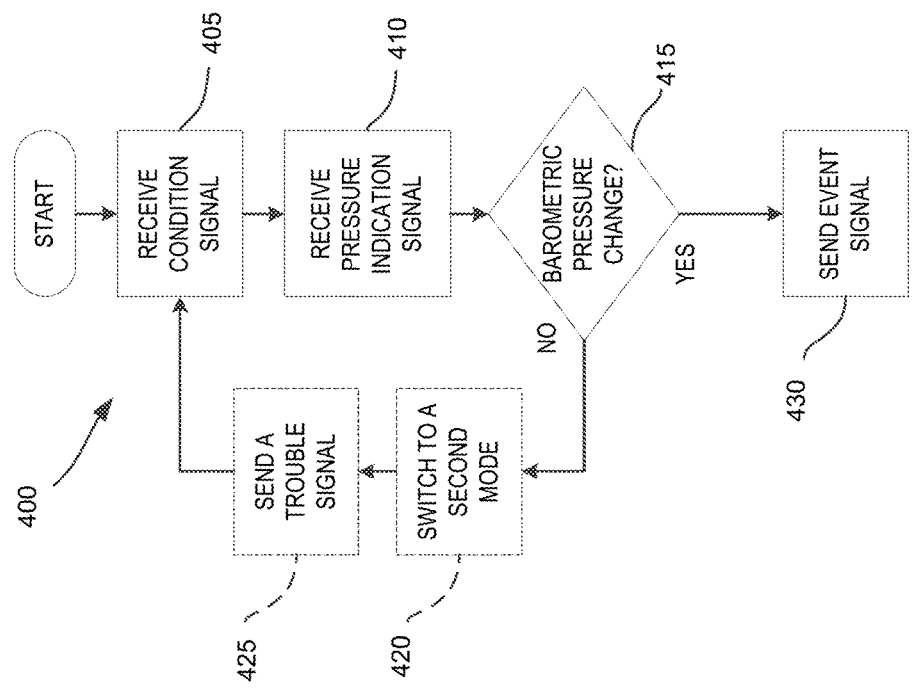
FIG. 4 is a flowchart of a method of operating the security monitoring system of FIG. 1.

FIG. 4 illustrates a method 400 for operating the security monitoring system 100. The method 400 is described below as being performed by the security system controller 105. However, it should be understood that the method 400 may be performed by the security system controller 105, a sensor (including the integrated sensor/barometer 300), a barometer, or a combination thereof. As illustrated in FIG. 4, the security system controller 105 receives an event signal indicative of an event from one of the plurality of sensors 115 (or the integrated sensor/barometer 300) (block 405). The security system controller 105 receives a pressure indication signal indicating a barometric pressure from one or more of the barometers 111, 112, and 113 (block 410). The security system controller 105 confirms the event designated by the event signal based on the barometer pressure indicated by the pressure indication signal. For example, in one embodiment, the security system controller 105 compares the received barometric pressure (i.e., a current barometric pressure) to a previously received barometric pressure (i.e., a stored barometric pressure in memory 206) to determine if there is a change in barometric pressure between the current barometric pressure and the previous barometric pressure (block 415). When there is no change in barometric pressure (e.g., a difference between the current barometric pressure and the previous barometric pressure is less than a predetermined threshold), the security system controller 105 suppresses the event signal and repeat the method 400. Optionally, in some embodiments, the security monitoring system 100 switches to a second mode of operation when there is no change in barometric pressure as indicated by a dashed line in FIG. 4 (block 420). The second mode of operation is described below in reference to FIG. 5. In addition, in some embodiments, the security system controller 105 may send a signal to the indicator 155 and/or the user interface 230 indicating that the security system controller 105 has detected an event but the event was not confirmed (e.g., the corresponding pressure change was not detected) (block 425). The indicator 155 can generate one or more notifications in response to this signal.

Alternatively, when the security system controller 105 detects a change in barometric pressure (e.g., the difference between the current barometric pressure and the previous barometric pressure is greater than the predetermined threshold), the security system controller 105 takes one or more automatic actions in response to the event signal, such as by sending a signal to the indicator 155 and/or to the user interface 230 instructing the indicator 155 and/or the user interface 230 to generate one or more notifications (e.g., alarms or warnings) (block 430).

It should be understood that the security system controller 105 can alternatively or in addition be configured to confirm an event designated by the event signal based on the barometer pressure indicated by the pressure indication signal by comparing a plurality of barometer pressures provided by a plurality of barometers (see e.g., method 600 described below).

Figure 5:
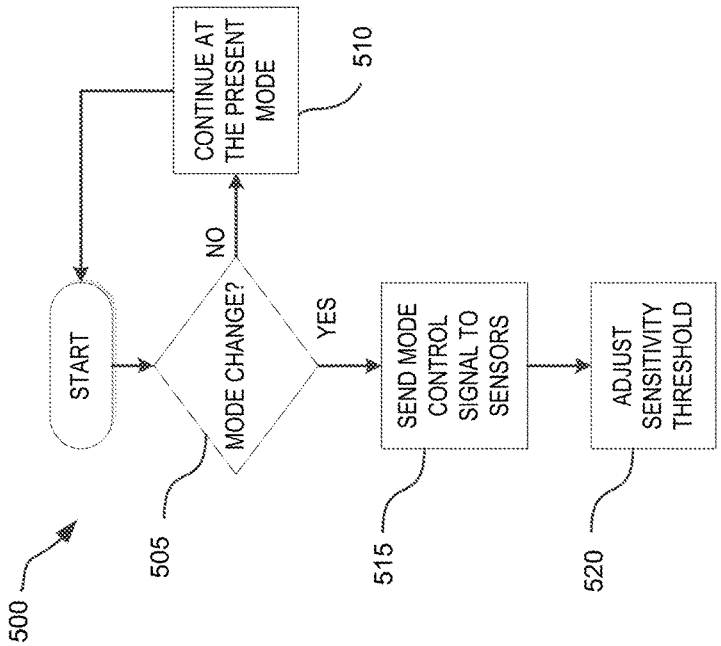
FIG. 5 is a flowchart of a method of changing modes of the security monitoring system of FIG. 1.

FIG. 5 illustrates a method 500 of changing a mode of operation of the security monitoring system 100. Again, the method 500 is described as being performed by the security system controller 105, but the method 500 may be performed by the security system controller 105, a sensor (including the integrated sensor/barometer 300), a barometer, or a combination thereof. As in block 420 of FIG. 4, the security system controller 105 determines whether a mode change has been triggered (block 505). When a mode change has not been triggered, the security monitoring system 100 continues to operate at the present mode (block 510). Conversely, when the mode change is triggered (see block 420 of FIG. 4), the security system controller 105 sends a mode control signal to at least one of the plurality of sensors 115 (block 515). Based on the mode control signal, the sensor receiving the mode control signal adjusts its operation. For example, the sensor receiving the mode control signal can adjust the programmed threshold applied by the sensor for detecting events (step 520).

Adjusting the threshold associated with a sensor impacts when the sensor detects an event based on the sensed condition. In some embodiments, the mode control signal sent by the security system controller 105 causes the sensor receiving the mode control signal to increase the threshold. For example, if a sensor transmitted the condition signal indicating the occurrence of an event that did not truly occur (i.e., when there is no corresponding change in barometric pressure), the security system controller 105 may transmit the mode control signal to the sensor to increase the threshold. As a consequence, the sensor will wait until it senses a higher level of the condition before transmitting the event signal. As a consequence, the sensor reports fewer false events to the security system controller 105. For example, the acoustic sensor 140 may transmit event signals based on relatively low levels of noise (e.g., ambient noise) that is not of interest to the security monitoring system 100. When the security system controller 105 does not receive a related change in barometric pressure, as would occur if an outside window was broken, the security system controller 105 may adjust the threshold of the acoustic sensor 140 via the mode control signal to increase the threshold and consequently reduce the number of condition signals received.

It should be understood that the security system controller 105 may be configured to apply the threshold for one or more of the plurality of sensors 115. For example, the security system controller 105 may be configured to receive signals from a sensor indicating the currently-sensed condition (e.g., a current noise level). The security system controller 105 then compares the received signal to a threshold to determine whether the sensed condition indicates an event (see method 600 described below).

As noted above, the security system controller 105 may be configured to confirm an event designated by the event signal based on the barometer pressure indicated by the pressure indication signal by comparing a plurality of barometer pressures provided by a plurality of barometers. For example, FIG. 6 illustrates a method 600 of operating the security monitoring system 100. Although the method 600 is described as being performed by the security system controller 105, the method 600 may be performed by the security system controller 105, a sensor (including the integrated sensor/barometer 300), a barometer, or a combination thereof. As illustrated in FIG. 6, the security system controller 105 receives a signal from one of the plurality of sensors 115 (e.g., the glass break sensor 120) in the first area 101 (block 605). The security system controller 105 receives a first barometric pressure from the first barometer 111 in the first area 101 (block 610). The security system controller also receives a second barometric pressure from the second barometer 112 in the second area 102 (step 615). The security system controller 105 determines a differential barometric pressure between the first barometric pressure and the second barometric pressure (block 620). The security system controller 105 also determines a plurality of differential barometric pressures between the first barometer 111 and the second barometer 112 over a period of time and stores the plurality of differential barometric pressures in the memory 206. Using the stored plurality of differential barometric pressures, the security system controller 105 determines an amount of change in the plurality of differential barometric pressures over time (e.g., the security system controller 105 may determine the amount of change in differential pressure between the last stored reading and a reading received after receiving a signal from the one of the plurality of sensors). The security system controller 105 determines if the condition is above a threshold (i.e., the threshold for detection of an event as described above) (block 625). When the condition is below the threshold, the security system controller 105 does not take any action relating to the condition (e.g., the security system controller 105 neither confirms or suppresses the event since no event has been reported by one of the plurality of sensors 115). However, when the condition is above the threshold, the security system controller 105 determines if an amount of change in the plurality of differential barometric pressures, as described above, is above another threshold (block 630). If the amount of change in the plurality of differential barometric pressures is above the another threshold, the security system controller 105 outputs an event signal to the indicator 155 (block 635). Conversely, if the amount of change in the plurality of differential barometric pressures is below the another threshold, the security system controller 105 may suppress the output of the event signal to the indicator (block 640). In some embodiments, the security system controller 105 is configured to send a trouble notification to the indicator 155 when the condition is above the threshold and the signals received from the barometers indicate that the change in differential pressure is below the another threshold (e.g., when the security system controller 105 suppresses activation of the event signal). The trouble notification indicates a trouble condition with the security monitoring system 100.

As an example of the method 600, if the barometric pressure in the first area 101 equalizes with the barometric pressure in the second area 102, the door 160 may have been opened between the first area 101 and the second area 102. The security system controller 105 detects this event as a change in differential pressure above the another threshold (e.g., as described above). In such a case, the signal from the one of the plurality of sensors 115 (e.g., a door alarm switch, a glass break sensor, or a thermal sensor positioned between the monitored areas) may be a first indication that an entry route has opened between the two monitored areas and the change in differential pressure between the two monitored areas confirms that the signal from the one of the plurality of sensors 115 is accurately reporting an event. As a consequence, the security system controller 105 confirms or suppresses the event signal indicating that the entry route has opened based on the changes in the plurality of differential barometric pressures. In other words, the security system controller 105 prevents the signal from the one of the plurality of sensors 115 from independently activating the indicator 155 and/or the user interface 230. As a consequence, suppression of the signal from the one of the plurality of sensors 115 based on changes in the plurality of differential barometric pressures prevents false indication of the event to the indicator 155.

It should be noted that in some embodiments, the security system controller 105 determines if there is any significant differential pressure (e.g., a differential pressure above yet another threshold) between the first barometer 111 and the second barometer 112. When there is no significant differential pressure, the security system controller 105 may output the event signal to the indicator 155 based solely on the signal from the one of the plurality of sensors 115 (e.g., if the signal from the one of the plurality of sensors indicates an event, the security system controller 105 simply forwards the indication of the event to the indicator without confirming or suppressing the event signal). As a consequence, when there is insufficient differential pressure to provide confirmation of the event (e.g., when the differential barometric pressures are already equalized), the security system controller 105 also will not suppress the event.

Thus, the invention provides, among other things, systems and methods for monitoring an area with a security monitoring system that confirms or suppresses reporting of events based on barometric pressures and, optionally, adjusts modes of operation of various types of sensors based on the barometric pressures. Various features and advantages of the invention are set forth in the following claims.

What is claimed is:

1. A security monitoring system comprising:
   at least one sensor;
   a barometer;
   an indicator; and
   a security system controller communicatively coupled to the least one sensor, the indicator, and the barometer and configured to
      receive a first signal from the at least one sensor, the first signal indicative of an alarm condition within a monitored area,
      receive a second signal from the barometer, the second signal indicative of a barometric pressure within the monitored area,
      determine whether the second signal indicates a change in the barometric pressure,
      when the first signal indicates that the condition is above a threshold and the second signal indicates a change in barometric pressure, output an event signal to the indicator, and
      when the first signal indicates that the condition is above the threshold and the second signal does not indicate a change in barometric pressure, send a third signal to the at least one sensor to adjust the threshold of the at least one sensor and suppress the output of the event signal until the first signal indicates that the condition is above an adjusted threshold.

2. The security monitoring system according to claim 1, wherein the security system controller is configured to change a mode of operation based on the first signal and the second signal.

3. The security monitoring system according to claim 2, wherein the security system controller is configured to change the mode of operation by adjusting the threshold.

4. The security monitoring system according to claim 1, wherein the event signal indicates that an event has occurred in the monitored area, the event being indicative of an alarm condition.

5. The security monitoring system according to claim 4, wherein the security system controller is configured to send a trouble notification to the indicator when the condition is above the threshold and the second signal does not indicate a change in barometric pressure.

6. The security monitoring system according to claim 1, further comprising another barometer positioned in another monitored area adjacent to the monitored area, and wherein the security system controller is configured to
   determine a plurality of differential barometric pressures between the monitored area and the another monitored area over a period of time, and
   store the plurality of differential barometric pressures in memory.

7. The security monitoring system according to claim 6, wherein the security system controller is configured to
   determine an amount of change in the plurality of differential barometric pressures between the monitored area and the another monitored area,
   output the event signal to the indicator when the condition is above the threshold and when the amount of change in the differential barometric pressure is above another threshold, and
   suppress the output of the event signal when the amount of change in the differential barometric pressure is below the another threshold.

8. The security monitoring system according to claim 7, wherein the security system controller is configured to output a door status signal indicating that a door between the monitored area and the another monitored area is being opened when the condition is above the threshold and when the amount of change is above the another threshold.

9. The security monitoring system according to claim 1, wherein the indicator is at least one from the group consisting of a warning light, a computer display, and a speaker.

10. A method of monitoring an area with a security system controller communicatively coupled to at least one sensor, an indicator, and a barometer, the method comprising:
   receiving a first signal, at the security system controller, from the at least one sensor, the first signal indicative of an alarm condition within a monitored area,
   receiving a second signal, at the security system controller, from the barometer, the second signal indicative of a barometric pressure within the monitored area,
   determining whether the second signal indicates a change in the barometric pressure;
   outputting an event signal to the indicator when the first signal indicates that the condition is above a threshold and the second signal indicates a change in barometric pressure;

sending a third signal to the at least one sensor to adjust the threshold of the at least one sensor and suppressing the output of the event signal until the first signal indicates that the condition is above an adjusted threshold when the first signal indicates that the condition is above the threshold and the second signal does not indicate a change in barometric pressure.

11. The method of monitoring an area according to claim 10, the method comprising changing a mode of operation based on the first signal and the second signal.

12. The method of monitoring an area according to claim 11, the method comprising changing the mode of operation by adjusting the threshold.

13. The method of monitoring an area according to claim 10, wherein the event signal indicates that an event has occurred in the monitored area, the event signal being indicative of an alarm condition.

14. The method of monitoring an area according to claim 10, the method comprising sending a trouble notification to the indicator when the condition is above the threshold and the second signal does not indicate a change in barometric pressure.

15. The method of monitoring an area according to claim 10, the method comprising outputting an event signal to the indicator by sending the event signal to at least one from the group consisting of a warning light, a computer display, and a speaker.

16. A security monitoring system comprising:
at least one sensor:
a barometer:
an indicator; and
a security system controller communicatively coupled to the at least one sensor, the indicator, and the barometer and configured to
receive a first signal from the at least one sensor, the first signal indicative of an alarm condition within a monitored area,
receive a second signal from the barometer, the second signal indicative of a barometric pressure within the monitored area,
confirm the first signal received from the at least one sensor based on the second signal received from the barometer,
when the first signal is confirmed, output a third signal to the indicator, the third signal indicative of an event within the monitored area, and
when the first signal is not confirmed, send a fourth signal to the at least one sensor to adjust the threshold of the at least one sensor and output a fifth signal to the indicator, the fifth signal indicative of a trouble status in the security monitoring system.

* * * * *